United States Patent
Watanabe et al.

(10) Patent No.: US 12,377,612 B2
(45) Date of Patent: Aug. 5, 2025

(54) APPARATUS AND METHOD FOR MANUFACTURING METAL-RESIN COMPOSITE

(71) Applicant: KOBE STEEL, LTD., Hyogo (JP)

(72) Inventors: Kenichi Watanabe, Kobe (JP); Shu Sekiguchi, Kobe (JP)

(73) Assignee: KOBE STEEL, LTD., Hyogo (JP)

( * ) Notice: Subject to any disclaimer, the term of this patent is extended or adjusted under 35 U.S.C. 154(b) by 219 days.

(21) Appl. No.: 18/175,512

(22) Filed: Feb. 27, 2023

(65) Prior Publication Data

US 2023/0311425 A1  Oct. 5, 2023

(30) Foreign Application Priority Data

Mar. 30, 2022 (JP) ................. 2022-055998

(51) Int. Cl.
| | |
|---|---|
| *B29C 65/64* | (2006.01) |
| *B29C 65/56* | (2006.01) |
| *B29C 65/78* | (2006.01) |
| *B29K 305/00* | (2006.01) |

(52) U.S. Cl.
CPC ............ *B29C 65/64* (2013.01); *B29C 65/565* (2013.01); *B29C 65/7814* (2013.01); *B29K 2305/00* (2013.01)

(58) Field of Classification Search
CPC .................................................. B29C 65/64
See application file for complete search history.

(56) References Cited

U.S. PATENT DOCUMENTS 5,023,041 A *  6/1991  Jones ................ B29C 70/46
                                                            264/510
2021/0078222 A1   3/2021  Jiang et al.

FOREIGN PATENT DOCUMENTS

| CN | 101247945 A | * | 8/2008 |
|---|---|---|---|
| DE | 102010043401 A1 | * | 5/2012 |
| DE | 102013105673 A1 | * | 4/2014 |
| DE | 10 2013 105673 B4 | | 1/2017 |
| EP | 2 813 339 A1 | | 12/2014 |
| JP | H04-191020 A | | 7/1992 |
| JP | 2005-199634 A | | 7/2005 |
| JP | 2006-307930 A | * | 11/2006 |
| JP | 4394391 B2 | * | 10/2009 |
| JP | 2020-104411 A | | 7/2020 |
| JP | 2021-091139 A | | 6/2021 |
| JP | 2021-183402 A | | 12/2021 |
| WO | 2019/224977 A1 | | 11/2019 |

OTHER PUBLICATIONS

The extended European search report issued by the European Patent Office on Aug. 25, 2023, which corresponds to European Patent Application 23163011.2-1014 and is related to U.S. Appl. No. 18/175,512.

* cited by examiner

*Primary Examiner* — Jeffry H Aftergut

(74) *Attorney, Agent, or Firm* — Studebaker Brackett PLLC

(57) ABSTRACT

An apparatus is configured to manufacture a metal-resin composite by press-molding a metal plate and a resin material. The apparatus includes an upper mold and a lower mold for sandwiching the metal plate and the resin material, and an elastic member attached to a molding surface of the lower mold. A cavity for disposing the resin material is provided by the upper mold and the lower mold. The elastic member is disposed to seal the resin material into the cavity by pressing the metal plate against the upper mold.

19 Claims, 8 Drawing Sheets

APPARATUS AND METHOD FOR MANUFACTURING METAL-RESIN COMPOSITE

CROSS-REFERENCE TO RELATED APPLICATIONS

This application claims priority of Japanese Patent Application No. 2022-055998 filed on Mar. 30, 2022, the contents of which are incorporated herein by reference.

BACKGROUND OF THE INVENTION

Technical Field

The present invention relates to an apparatus and a method for manufacturing a metal-resin composite.

Background Art

An apparatus for manufacturing a metal-resin composite by press-molding a metal member and a thermosetting resin material is known (for example, JP 2020-104411 A).

SUMMARY

When the metal-resin composite is press-molded, it is difficult to close the gap between the upper mold and the lower mold as compared with the case where only the resin material is press-molded. As a result, the resin material may leak to an unintended place through a gap between the upper mold and the lower mold of the mold. Such leakage of the resin material leads to problems such as spot welding failure in the subsequent assembly steps, mold fixing due to inflow of the resin material into other gaps of the mold, or an unfilled state due to insufficient filling pressure of the resin material.

An object of the present invention is to suppress leakage of a resin material to an unintended place in an apparatus and a method for manufacturing a metal-resin composite.

A first aspect of the present invention provides an apparatus for manufacturing a metal-resin composite by press-molding a metal member and a resin material, the apparatus including: an upper mold and a lower mold configured to sandwich the metal member and the resin material; and an elastic member to be attached to a molding surface of the lower mold. A cavity for disposing the resin material is provided by the upper mold and the lower mold. The elastic member is disposed to seal the resin material into the cavity by pressing the metal member against the upper mold.

According to this configuration, since the metal member is pressed against the upper mold by the elastic member, the resin material is sealed into the cavity. Therefore, leakage of the resin material from the cavity can be suppressed, and leakage of the resin material to an unintended place can be suppressed. By suppressing the leakage of the resin material, the filling pressure of the resin material in the cavity is increased, and stable molding of the resin material can be achieved. Therefore, the metal-resin composite having stable quality can be manufactured.

The metal-resin composite may have, in a cross section perpendicular to a longitudinal direction, a bottom wall portion extending in a horizontal direction, a side wall portion rising from each of both ends of the bottom wall portion, and a flange portion extending outward in a horizontal direction from the side wall portion. The upper mold may have, in the cross section, a first molding upper surface for molding the bottom wall portion, a second molding upper surface for molding the side wall portion, and a third molding upper surface for molding the flange portion. The lower mold may have, in the cross section, a first molding lower surface for molding the bottom wall portion, a second molding lower surface for molding the side wall portion, and a third molding lower surface for molding the flange portion.

According to this configuration, the cross-sectional shape of the metal-resin composite is molded into a hat shape. The hat-shaped metal-resin composite has high versatility and can be used for various applications.

The second molding upper surface may be provided with a step.

According to this configuration, since the resin material needs to flow beyond the step of the upper mold in order to leak out of the cavity, it is possible to suppress the leakage of the resin material. Therefore, the filling pressure in the cavity of the resin material can be increased, and the quality can be improved.

The second molding lower surface may be provided with a holding groove for holding the elastic member. A thickness of the elastic member may be greater than a depth of the holding groove.

According to this configuration, since the elastic member can be held by the holding groove, the elastic member can be easily positioned and the movement of the elastic member during molding can be restricted. In addition, since the elastic member protrudes from the second molding lower surface, the elastic member is sandwiched between the upper mold (specifically, the metal member) and the lower mold, and receives a compressive force. Therefore, the effectiveness of the sealing function of the elastic member can be enhanced.

The holding groove may have a shape in which a bottom portion is wider than an opening portion in the cross section.

According to this configuration, since the elastic member is caught in the holding groove, it is possible to prevent the elastic member from coming off the holding groove. At the time of press molding, since the elastic member receives pressure and deforms in accordance with the shape of the holding groove, the effect of preventing the elastic member from coming off can be exerted regardless of the shape of the elastic member.

The holding groove may be, in the cross section, disposed at a same height position as the step or at a position higher than the step in a state where the upper mold and the lower mold are closed.

According to this configuration, since the metal member is pressed against the upper mold by the elastic member at the same height position as the step or at a position higher than the step, the resin material is sealed at a position lower than the step. Therefore, it is possible to further suppress the flow of the resin material beyond the step of the upper mold, and it is possible to further increase the filling pressure in the cavity of the resin material and to improve the quality. Here, the holding groove being disposed at the same height position as the step means that the holding groove and the step are disposed to overlap each other in the height direction (vertical direction). In addition, the holding groove being disposed at a position higher than the step means that the holding groove and the step are not disposed to overlap each other in the height direction (vertical direction), and the holding groove is positioned above the step.

The elastic member may have, in the cross section, a shape in which an end portion protruding from the holding groove is chamfered or rounded.

According to this configuration, it is possible to prevent the end portion protruding from the holding groove from being deformed so as to spread along the second molding lower surface and being unintentionally sandwiched between the metal member and the lower mold. Accordingly, damage or mold galling (abnormal wear) of the elastic member can be suppressed. Specifically, it is possible to suppress mold galling (abnormal wear) due to an excessive increase in compressive force between the upper mold and the metal member.

The elastic member may have, in the cross section, a shape in which an end portion to be inserted into the holding groove is chamfered or rounded.

According to this configuration, a deformation margin of the elastic member can be secured in the holding groove. If there is no deformation margin of the elastic member, very high pressure is applied to the elastic member, and mold galling may occur. Specifically, it is possible to suppress mold galling (abnormal wear) due to an excessive increase in compressive force between the upper mold and the metal member.

A second aspect of the present invention provides a method for manufacturing a metal-resin composite by press-molding a metal member and a resin material, the method including: sandwiching the metal member and the resin material with an upper mold and a lower mold; pressing the metal member against the upper mold through an elastic member by the sandwiching to seal a cavity formed by the upper mold and the lower mold; and integrating the metal member and the resin material by the press molding while sealing the resin material into the cavity.

According to this method, since the metal member is pressed against the upper mold by the elastic member, the resin material is sealed into the cavity. Therefore, leakage of the resin material from the cavity can be suppressed, and leakage of the resin material to an unintended place can be suppressed. By suppressing the leakage of the resin material, the filling pressure of the resin material in the cavity is increased, and stable molding of the resin material 20 can be achieved. Therefore, the metal-resin composite having stable quality can be manufactured.

The method may further include press-molding only the metal member into a hat shape before integrating the metal member and the resin material by the press molding.

According to this method, since the metal member is press-molded alone, the molding accuracy can be improved. In addition, the hat-shaped metal-resin composite has high versatility and can be used for various applications.

According to the present invention, in an apparatus and a method for manufacturing a metal-resin composite, leakage of a resin material to an unintended place can be suppressed.

DETAILED DESCRIPTION OF THE PREFERRED EMBODIMENT

Hereinafter, an apparatus and a method for manufacturing a metal-resin composite will be described as preferred embodiments of the present invention with reference to the accompanying drawings.

First Preferred Embodiment

Figure 1:
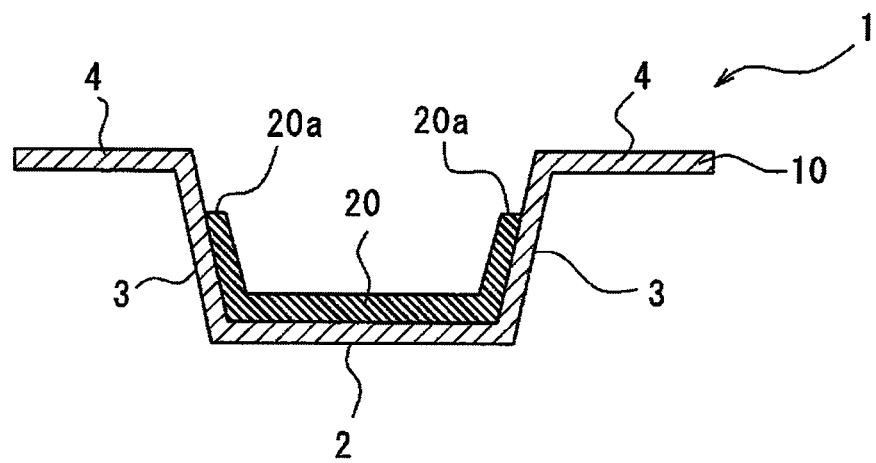
FIG. 1 is a cross-sectional view of a metal-resin composite.

Referring to FIG. 1, a metal-resin composite 1 manufactured in the present preferred embodiment includes a metal plate (metal member) 10 and a resin material 20. The metal-resin composite 1 has a hat shape in a cross section perpendicular to the longitudinal direction. Specifically, the metal-resin composite 1 is formed by fixing the resin material 20 to the inner surface (recessed surface) of the hat-shaped metal plate 10. However, the shape of the metal-resin composite 1 is not limited to a hat shape, and may be any shape.

The metal-resin composite 1 includes a bottom wall portion 2 extending in the horizontal direction, a side wall portion 3 rising from each of both ends of the bottom wall portion 2, and a flange portion 4 extending outward in the horizontal direction from the side wall portion 3. The bottom wall portion 2 is made of a metal plate 10 and a resin material 20, the side wall portion 3 is made of a metal plate 10 and a resin material 20, and the flange portion 4 is made of only the metal plate 10. The resin material 20 terminates at the end surface 20a halfway through the side wall portion 3 from the bottom wall portion 2 toward the flange portion 4.

An apparatus 50 and a method for manufacturing a metal-resin composite 1 in the present embodiment will be described with reference to FIGS. 2 to 6. In the figures, a horizontal direction is represented as an X direction, and a vertical direction (up-down direction or height direction) is represented as a Y direction. In addition, the metal-resin composite 1 (the metal plate 10 and the resin material 20) and an elastic member 124 to be described below are assigned with hatching to indicate a cross section, but hatching is omitted for other members for clarity of illustration.

In the present preferred embodiment, the press molding is performed twice while steps 1 to 5 shown in FIGS. 2 to 6 are sequentially performed. A first round of pressing is performed in the first to third steps shown in FIGS. 2 to 4, and a second round of pressing is performed in the third to sixth steps shown in FIGS. 4 to 6. It should be noted that in the present preferred embodiment, the first and second rounds of pressing are performed in the same mold 100, but the first and second rounds of pressing may be performed in different molds. In addition, the metal-resin composite 1 may be produced one by one, that is, the first round of pressing and the second round of pressing may be continuously performed. Alternatively, molding of the required number of metal plates 10 (a first round of pressing) may be repeatedly performed, and then integral molding of the metal plate 10 and the resin material 20 (a second round of pressing) may be repeatedly performed. It should be noted that, as will be described in detail below, since there is a time for installing the resin material 20 on the metal plate 10 and a time for attaching and detaching the elastic member 124, the latter is preferable from the viewpoint of shortening these times.

An apparatus 50 for manufacturing a metal-resin composite 1 in the present preferred embodiment includes a mold 100, a drive unit 130 that drives the mold 100, and a heating unit 140 that heats the mold 100. It should be noted that the drive unit 130 and the heating unit 140 can be obtained using known units capable of executing press molding, are illustrated only in FIG. 2 as a conceptual diagram without illustrating details, and illustration thereof is omitted in FIG. 3 and subsequent drawings.

The mold 100 press-molds the metal plate 10 and the resin material 20 to manufacture the metal-resin composite 1. The mold 100 includes an upper mold 110 and a lower mold 120 that sandwich the metal plate 10 and the resin material 20. In the present preferred embodiment, the upper mold 110 is configured as a punch, and the lower mold 120 is configured as a mold. The upper mold 110 is movable in the vertical direction by the drive unit 130, that is, is configured to be capable of approaching and separating from the lower mold 120. However, a driving mode of the mold 100 by the drive unit 130 is not particularly limited, and the drive unit 130 may move at least one of the upper mold 110 and the lower mold 120 in the vertical direction.

The upper mold 110 has a first molding upper surface 111 for molding the bottom wall portion 2 (see FIG. 1), a second molding upper surface 112 for molding the side wall portion 3 (see FIG. 1), and a third molding upper surface 113 for molding the flange portion 4 (see FIG. 1). In the present preferred embodiment, the first molding upper surface 111 and the third molding upper surface 113 are configured as horizontal planes, and the second molding upper surface 112 is configured to connect the first molding upper surface 111 and the third molding upper surface 113 and to be inclined from the vertical direction.

In the present preferred embodiment, the second molding upper surface 112 is provided with a step 112a. The step 112a is provided so as to rise from the first molding upper surface 111 toward the third molding upper surface 113 by one step.

The lower mold 120 has a first molding lower surface 121 for molding the bottom wall portion 2 (see FIG. 1), a second molding lower surface 122 for molding the side wall portion 3 (see FIG. 1), and a third molding lower surface 123 for molding the flange portion 4 (see FIG. 1). In the present preferred embodiment, the first molding lower surface 121 and the third molding lower surface 123 are configured as horizontal planes, and the second molding lower surface 122 is configured to connect the first molding lower surface 121 and the third molding lower surface 123 and to be inclined from the vertical direction. The first molding lower surface 121 is disposed to face the first molding upper surface 111, the second molding lower surface 122 is disposed to face the second molding upper surface 112, and the third molding lower surface 123 is disposed to face the third molding upper surface 113.

In the present preferred embodiment, the second molding lower surface 122 is provided with a holding groove 122b. The holding groove 122b is a recess for holding an elastic member 124 to be described below, and has a depth in a direction perpendicular to the second molding lower surface 122. However, the holding groove 122b is not an essential configuration, and may be omitted as necessary.

Figure 2:
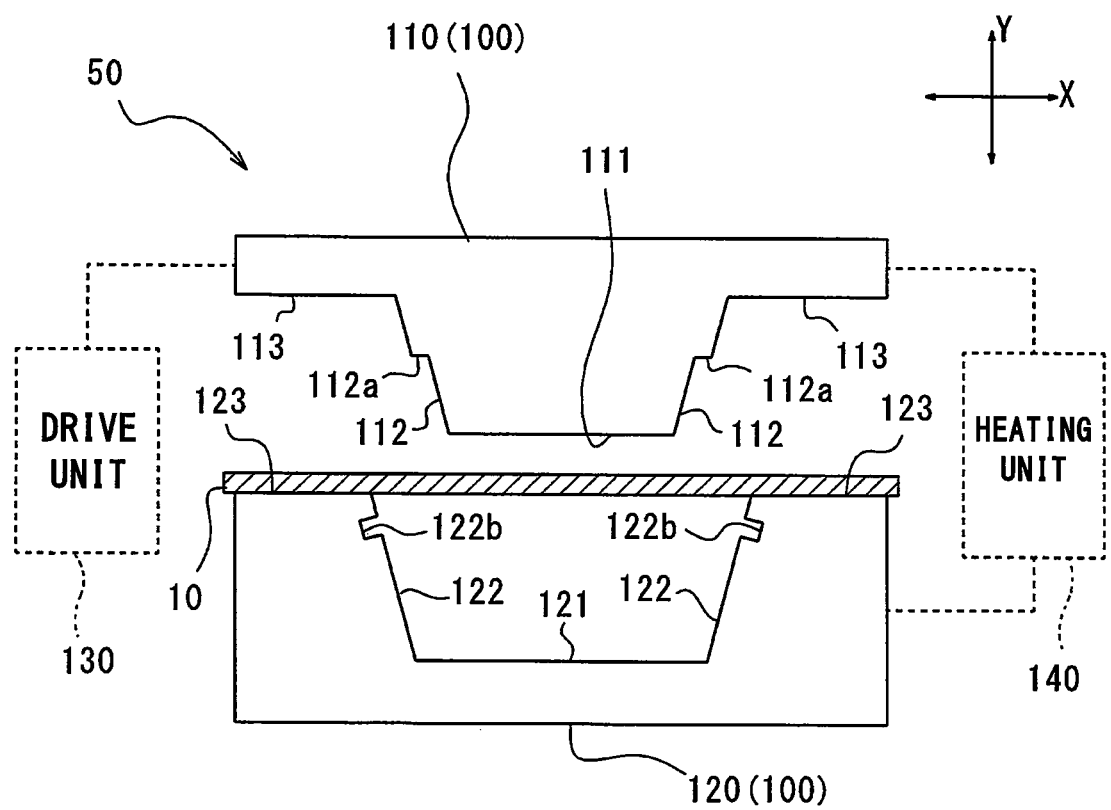
FIG. 2 is a cross-sectional view showing a first step of a method for manufacturing a metal-resin composite in a first preferred embodiment.

In the first step shown in FIG. 2, the upper mold 110 and the lower mold 120 are heated by the heating unit 140 to be prepared to be able to perform warm-pressing. In addition, a flat plate-shaped metal plate 10 before molding is placed on the lower mold 120. Here, the molding (the first round of pressing) of the metal plate 10 may be performed in any of the warm-pressing and the cold-pressing. However, when the first round of pressing and the second round of pressing are continuously performed as described above, the molding of the metal plate 10 (the first round of pressing) is preferably performed also by warm-pressing from the viewpoint of production efficiency.

Figure 3:
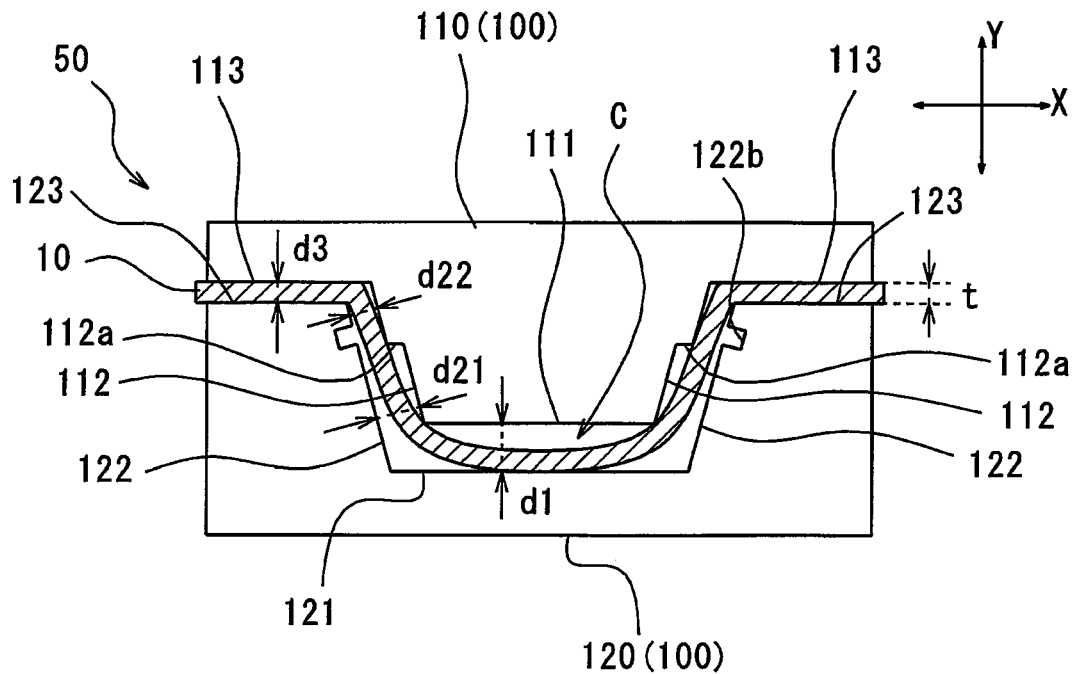
FIG. 3 is a cross-sectional view showing a second step of the method for manufacturing a metal-resin composite in the first preferred embodiment.

In the second step shown in FIG. 3, the upper mold 110 is lowered, and the metal plate 10 is sandwiched between the upper mold 110 and the lower mold 120 to be press-molded into a substantially hat shape. In a state where the upper mold 110 and the lower mold 120 are closed, a distance d1 between the first molding upper surface 111 and the first molding lower surface 121 is larger than the thickness t of the metal plate 10 (d1>t), and a distance d3 between the third molding upper surface 113 and the third molding lower surface 123 is substantially equal to the thickness t of the metal plate 10 (d3=t). In addition, a distance d21 between the second molding upper surface 112 below the step 112a and the second molding lower surface 122 is larger than the thickness t of the metal plate 10 (d21>t), and a distance d22 between the second molding upper surface 112 above the step 112a and the second molding lower surface 122 is substantially equal to or slightly larger than the thickness t of the metal plate 10 (d22=t or d22>t). In particular, by setting the distance d22 equal to the thickness t of the metal plate 10, the filling pressure of the resin material 20 in the subsequent steps can be increased. It should be noted that in the present step, the resin material 20 (see FIGS. 4 to 6) is not yet filled, and only the metal plate 10 is sandwiched between upper mold 110 and lower mold 120. In a state where the upper mold 110 and the lower mold 120 are closed, a cavity C for being filled with the resin material 20 is provided between the first to second molding upper surfaces 111 to 112 and the first to second molding lower surfaces 121 to 122 (specifically, the metal plate 10).

Figure 4:
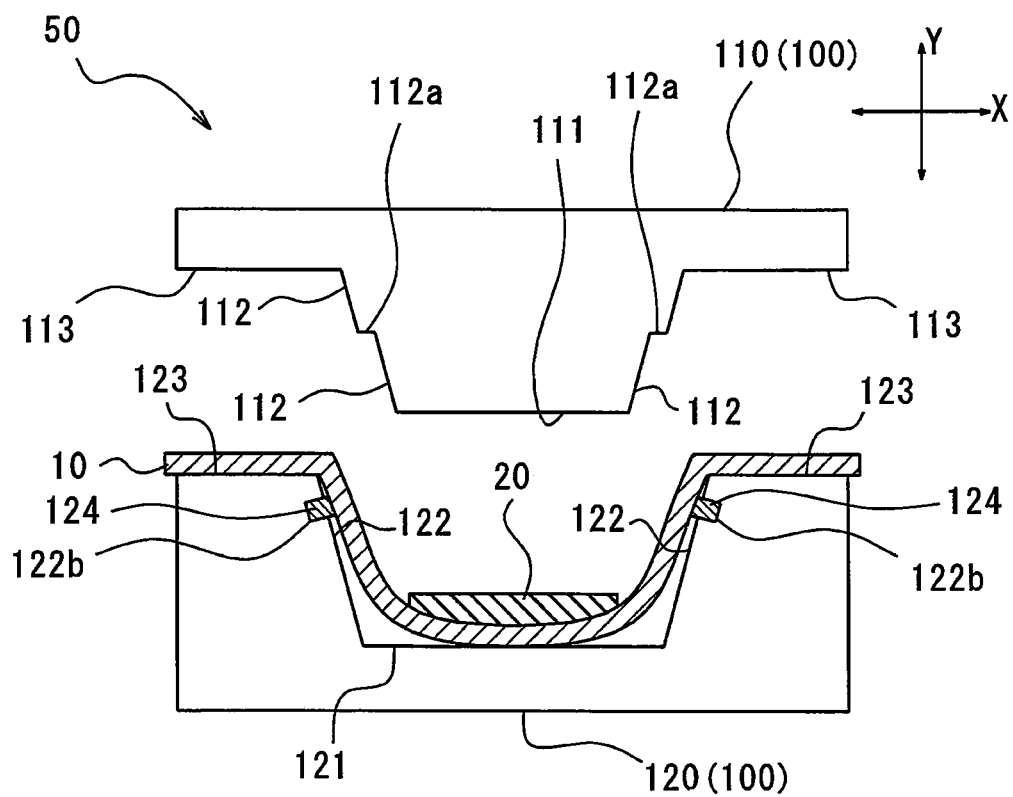
FIG. 4 is a cross-sectional view showing a third step of the method for manufacturing a metal-resin composite in the first preferred embodiment.

In the third step shown in FIG. 4, the upper mold 110 is raised. At this time, the metal plate 10 is molded in a substantially hat shape close to the final shape (see FIG. 1). After the upper mold 110 is raised, an elastic member 124 is attached to the holding groove 122b of the lower mold 120 for the second round of pressing. The elastic member 124 has elasticity and is made of, for example, silicone rubber. In the present preferred embodiment, the elastic member 124 has a rectangular parallelepiped shape extending along the holding groove 122b, and has a rectangular shape in the cross section in FIG. 4. The elastic member 124 is disposed so as to seal the resin material 20 in the cavity C. The elastic member 124 protrudes from the second molding lower surface 122 in a state of being attached to the holding groove 122b. After the elastic member 124 is attached, a sheet-shaped resin material 20 (also referred to as prepreg) cut into necessary dimensions is placed on the metal plate 10. In the present preferred embodiment, the resin material 20 is cured at a high temperature and a high pressure by a molding method referred to as the sheet molding compound (SMC) method (see the fourth step described below). In the present preferred embodiment, as the resin material 20, a fiber reinforced plastic (FRP) in which glass fibers or carbon fibers are impregnated into a resin is used. In addition, in the present preferred embodiment, the resin material 20 has thermosetting properties. In the present step, the resin material 20 is not yet heated, that is, not cured. It should be noted that The resin material 20 does not need to have a sheet shape, and may have any shape.

Figure 5:
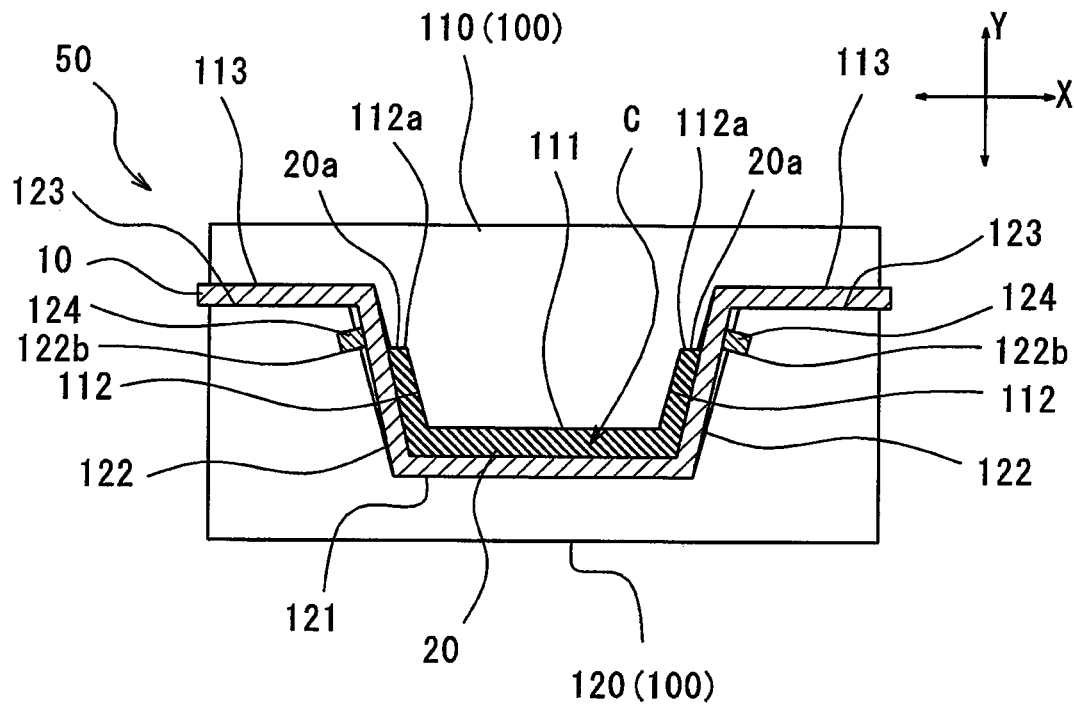
FIG. 5 is a cross-sectional view showing a fourth step of the method for manufacturing a metal-resin composite in the first preferred embodiment.

In the fourth step shown in FIG. 5, the upper mold 110 is lowered, and the metal plate 10 and the resin material 20 are sandwiched between the upper mold 110 and the lower mold 120 to be press-molded into a complete hat shape. In the present preferred embodiment, the elastic member 124 is attached at a position higher than the step 112a in a state where the upper mold 110 and the lower mold 120 are closed (see FIG. 5). The elastic member 124 seals the resin material 20 into the cavity C by pressing the metal plate 10 against the upper mold 110 (particularly, the second molding upper surface 112 above the step 112a). In this manner, the resin material 20 cut into a necessary size by the SMC method is put into the mold 100 and cured under high temperature and high pressure. In the present preferred embodiment, the cavity C refers to a space below the step 112a formed by being sandwiched between the upper mold 110 and the lower mold 120 (specifically, the metal plate 10). The resin material 20 is heated in the cavity C and is cured without leaking from the cavity C. At this time, the resin material 20 abuts on the step 112a at the end surface 20a.

Figure 6:
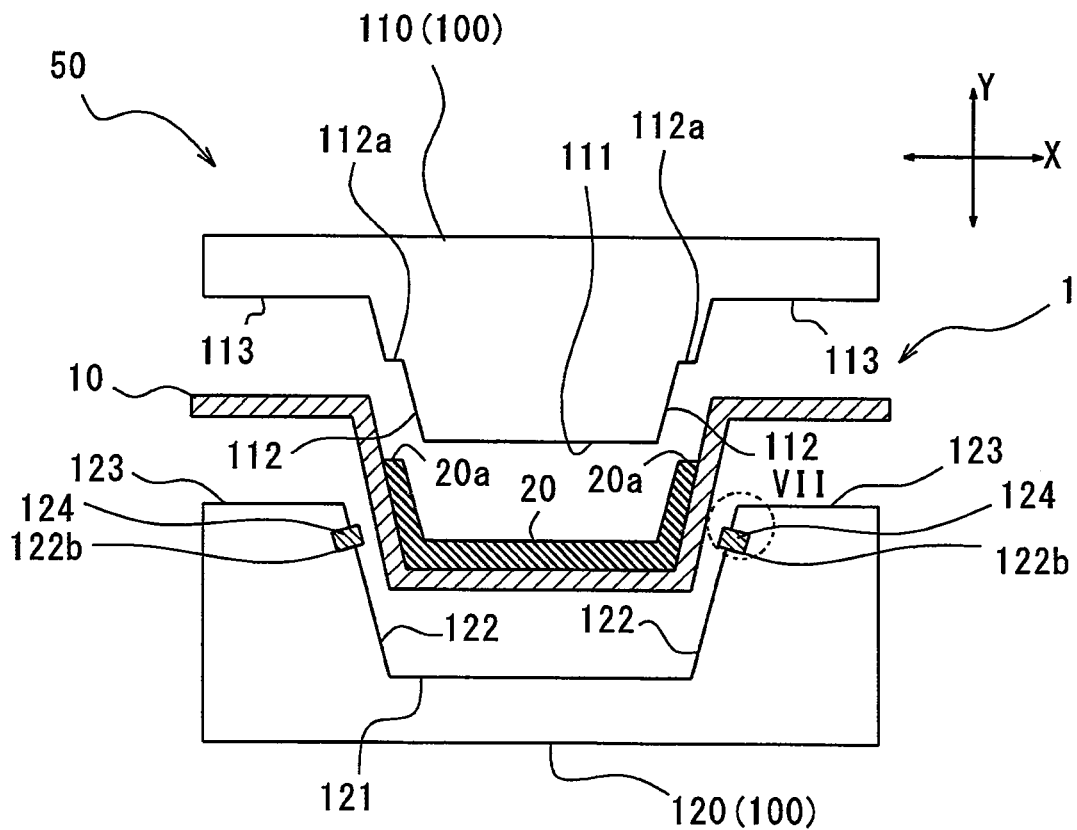
FIG. 6 is a cross-sectional view showing a fifth step of the method for manufacturing a metal-resin composite in the first preferred embodiment.

In the fifth step shown in FIG. 6, the upper mold 110 is raised. The metal plate 10 is molded into a final shape (a hat shape in the present preferred embodiment), the resin material 20 is fixed to an upper surface (a hat-shaped recessed surface) of the metal plate 10, and the metal-resin composite 1 is formed. It should be noted that the elastic member 124 is restored to its original shape by its elasticity and can be reused. Preferably, the elastic member 124 has heat resistance to sufficiently withstand heating from the heating unit 140 (see FIG. 2).

Figure 7:
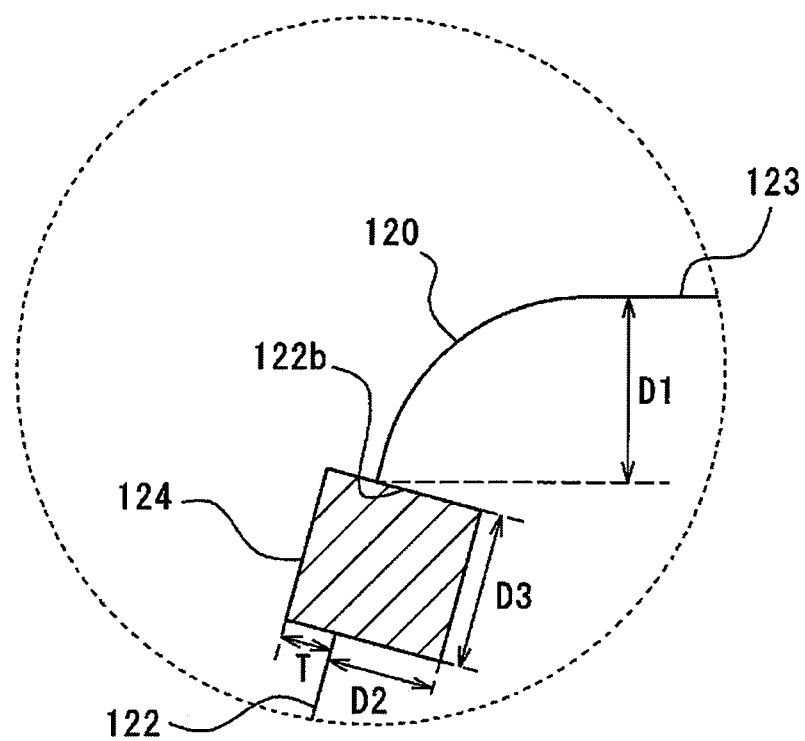
FIG. 7 is an enlarged cross-sectional view showing a portion of the broken line circle VII in FIG. 6.

FIG. 7 is an enlarged cross-sectional view showing a portion of the broken line circle VII in FIG. 6.

In the present preferred embodiment, the holding groove 122b is provided at a position 6 mm downward apart from the third molding lower surface 123 (D1=6 mm). The corner portion serving as the boundary between the second molding lower surface 122 and the third molding lower surface 123 includes a curved surface having a radius of 5 mm. The holding groove 122b is provided not at the corner portion but on the second molding upper surface 112. The holding groove 122b has a depth D2 of 4 mm and a width D3 of 5 mm.

In the present preferred embodiment, the elastic member 124 has a square shape with a side of 5 mm in the cross section in FIG. 7. Therefore, the elastic member 124 protrudes from the holding groove 122b by 1 mm (T=1 mm). That is, the thickness (T+D2) of the elastic member 124 is larger by the thickness T than the depth D2 of the holding groove 122b.

As described below, the shapes of the holding groove 122b and the elastic member 124 are not limited to the above, and may be various.

According to the present preferred embodiment, since the metal plate 10 is pressed against the upper mold 110 by the elastic member 124, the resin material 20 is sealed in the cavity C. Therefore, leakage of the resin material 20 from the cavity C can be suppressed, and leakage of the resin material 20 to an unintended place (for example, the flange portion 4 or the like) can be suppressed. By suppressing the leakage of the resin material 20, the filling pressure of the resin material 20 in the cavity C is increased, and stable molding of the resin material 20 can be achieved. Therefore, the metal-resin composite 1 having stable quality can be manufactured.

In addition, in the present preferred embodiment, the cross-sectional shape of the metal-resin composite 1 is molded into a hat shape. The hat-shaped metal-resin composite 1 has high versatility and can be used for various applications.

In addition, since the resin material 20 needs to flow beyond the step 112a of the upper mold 110 in order to leak out of the cavity C, it is possible to suppress the leakage of the resin material 20. Therefore, the filling pressure in the cavity C of the resin material 20 can be increased, and the quality can be improved.

In addition, in the present preferred embodiment, since the elastic member 124 can be held by the holding groove 122b, the elastic member 124 can be easily positioned and the movement of the elastic member 124 during molding can be restricted. In addition, since the elastic member 124 protrudes from the second molding lower surface 122, the elastic member 124 is sandwiched between the upper mold 110 (specifically, the metal plate 10) and the lower mold 120 and receives a compressive force. Therefore, the effectiveness of the sealing function of the elastic member 124 can be enhanced. It should be noted that in the above description, an example in which the elastic member 124 is made of silicon rubber has been described, but alternatively, the elastic member may be a member having elasticity such as a metal corrugated plate.

Figure 8:
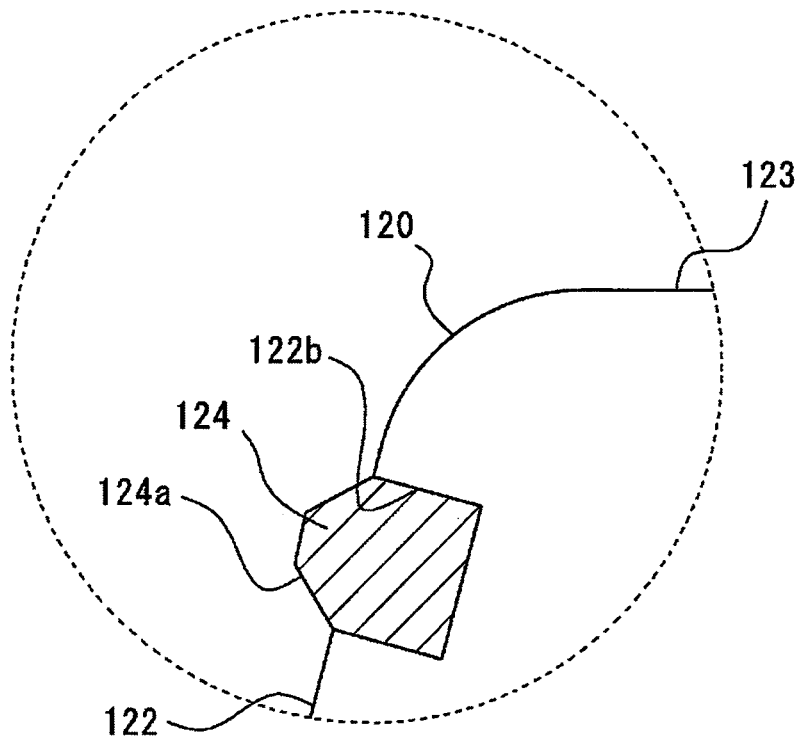
FIG. 8 is a cross-sectional view showing a first modification of FIG. 7.

FIG. 8 is a cross-sectional view showing a first modification of FIG. 7.

In the elastic member 124 of the first modification, an end portion 124a protruding from the holding groove 122b is chamfered in the illustrated cross section. The chamfering is, for example, C chamfering having a chamfering angle of 45°.

Figure 9:
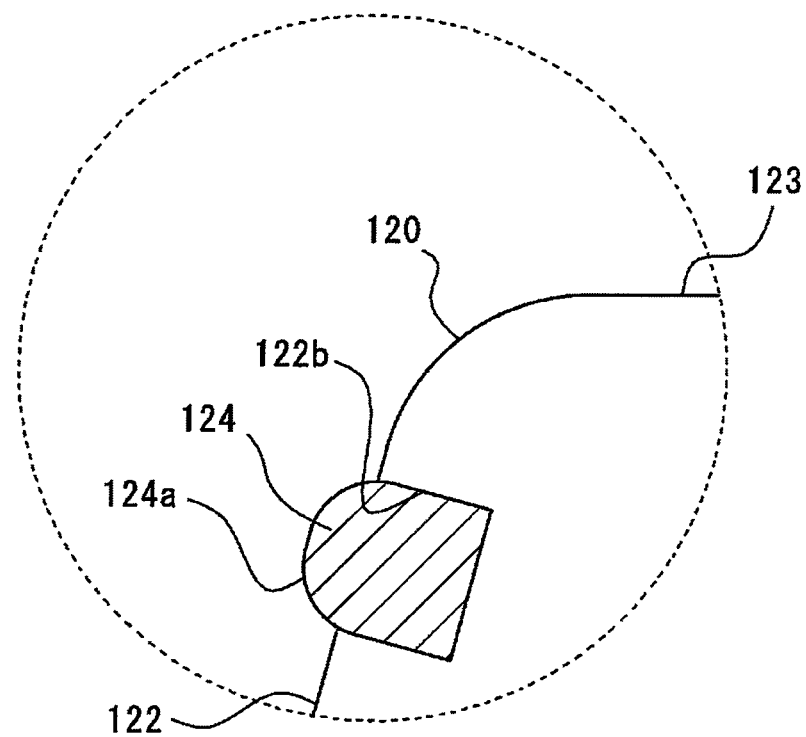
FIG. 9 is a cross-sectional view showing a second modification of FIG. 7.

FIG. 9 is a cross-sectional view showing a second modification of FIG. 7.

In the second modification, the elastic member 124 has a shape in which the end portion 124a protruding from the holding groove 122b is rounded in the illustrated cross section. The rounded shape is, for example, a semicircular shape in the illustrated cross section.

According to the first and second modifications, it is possible to prevent the end portion 124a protruding from the holding groove 122b from being deformed so as to spread along the second molding lower surface 122 and being unintentionally sandwiched between the metal plate 10 and the lower mold 120. Accordingly, damage or mold galling (abnormal wear) of the elastic member 124 can be suppressed. Specifically, it is possible to suppress mold galling (abnormal wear) due to an excessive increase in compressive force between the upper mold 110 and the metal plate 10.

Figure 10:
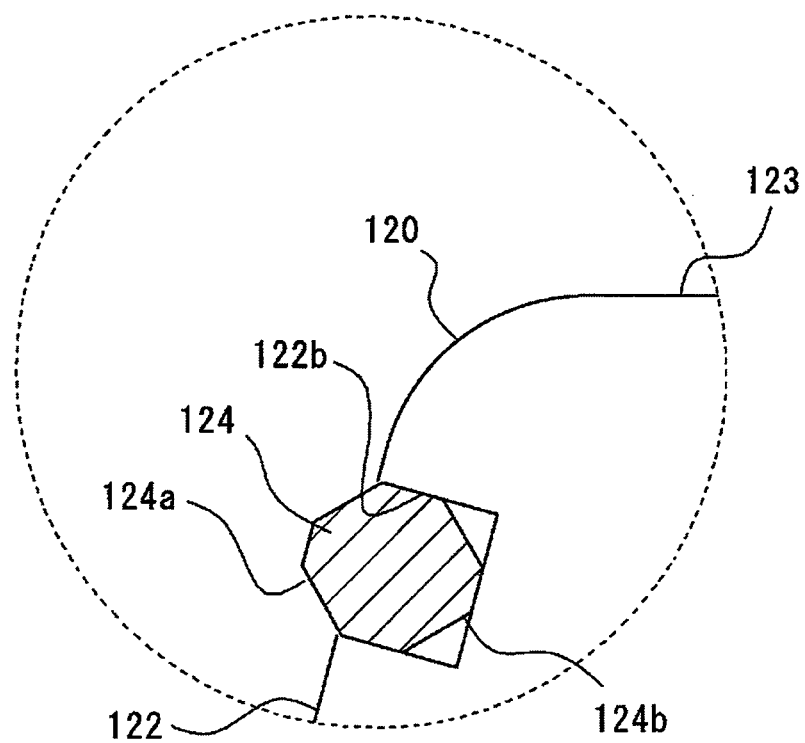
FIG. 10 is a cross-sectional view showing a third modification of FIG. 7.

FIG. 10 is a cross-sectional view showing a third modification of FIG. 7.

In the third modification, in the elastic member 124, not only the end portion 124a protruding from the holding groove 122b but also the end portion 124b inserted into the holding groove 122b is chamfered in the illustrated cross section. The chamfering is, for example, C chamfering having a chamfering angle of 45°.

Figure 11:
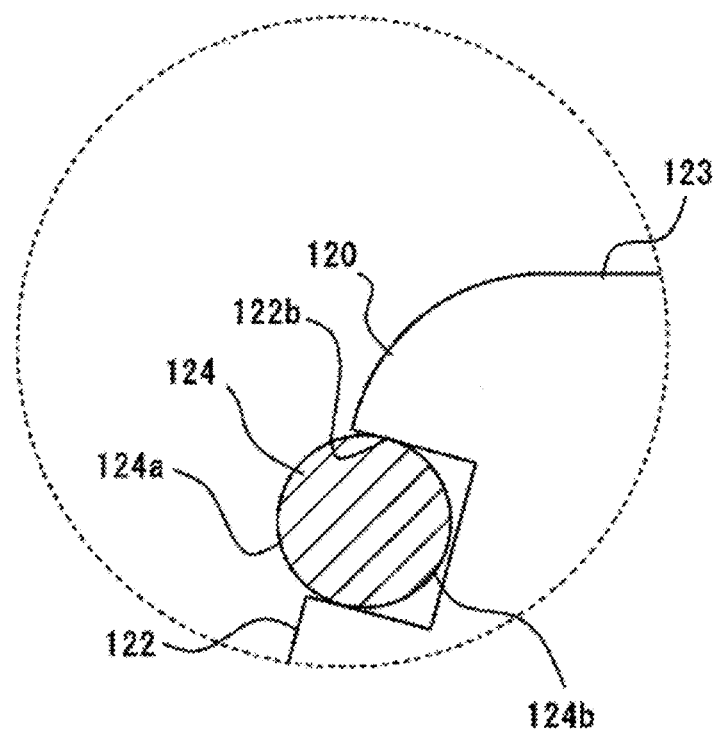
FIG. 11 is a cross-sectional view showing a fourth modification of FIG. 7.

FIG. 11 is a cross-sectional view showing a fourth modification of FIG. 7.

In the fourth modification, in the elastic member 124, not only the end portion 124a protruding from the holding groove 122b but also the end portion 124b inserted into the holding groove 122b has a rounded shape in the illustrated cross section. The rounded shape is, for example, a semicircular shape in the illustrated cross section. That is, the elastic member 124 of the present modification has a circular shape in the illustrated cross section.

According to the third and fourth modifications, a deformation margin of the elastic member 124 can be secured in the holding groove 122b. If there is no deformation margin of the elastic member 124, very high pressure is applied to the elastic member 124, and mold galling may occur. Specifically, it is possible to suppress mold galling (abnormal wear) due to an excessive increase in compressive force between the upper mold 110 and the metal plate 10.

Figure 12:
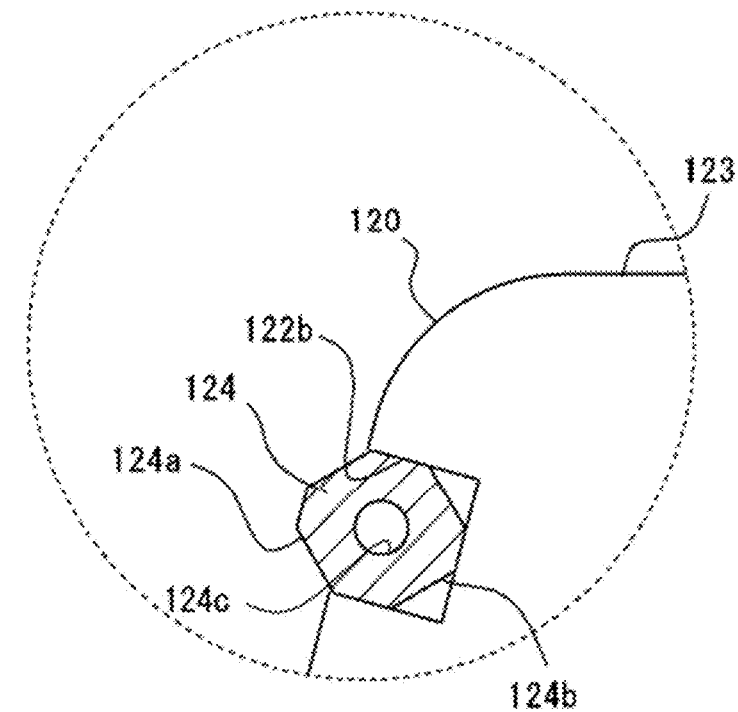
FIG. 12 is a cross-sectional view showing a fifth modification of FIG. 7.

FIG. 12 is a cross-sectional view showing a fifth modification of FIG. 7.

In the fifth modification, in the elastic member 124, not only the end portion 124a protruding from the holding groove 122b but also the end portion 124b inserted into the holding groove 122b is chamfered in the illustrated cross section. The chamfering is, for example, C chamfering having a chamfering angle of 45°. In addition, the elastic member 124 of the fifth modification has a hollow space 124c at the inner center. In the illustrated cross section, the hollow space 124c is circular.

According to the fifth modification, flexibility of the elastic member 124 can be improved, and occurrence of mold galling due to application of a very high pressure to the elastic member 124 can be suppressed. Specifically, it is possible to suppress mold galling (abnormal wear) due to an excessive increase in compressive force between the upper mold 110 and the metal plate 10.

Figure 13:
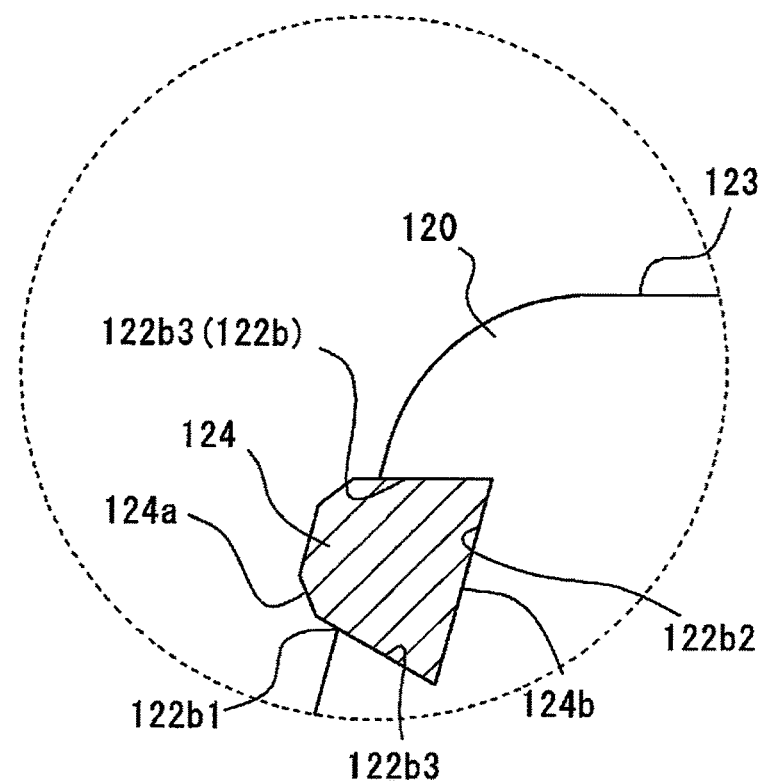
FIG. 13 is a cross-sectional view showing a sixth modification of FIG. 7.

FIG. 13 is a cross-sectional view showing a sixth modification of FIG. 7.

In the sixth modification, the holding groove 122b has a shape in which the bottom portion 122b2 is wider than the opening portion 122b1 in the illustrated cross section. Specifically, the inner side surface 122b3 connecting the opening portion 122b1 and the bottom portion 122b2 is tapered so as to be narrowed from the bottom portion 122b2 toward the opening portion 122b1. In addition, the elastic member 124 has an end portion 124a having the same shape as that of the fifth modification and an end portion 124b having a shape complementary to the holding groove 122b.

Figure 14:
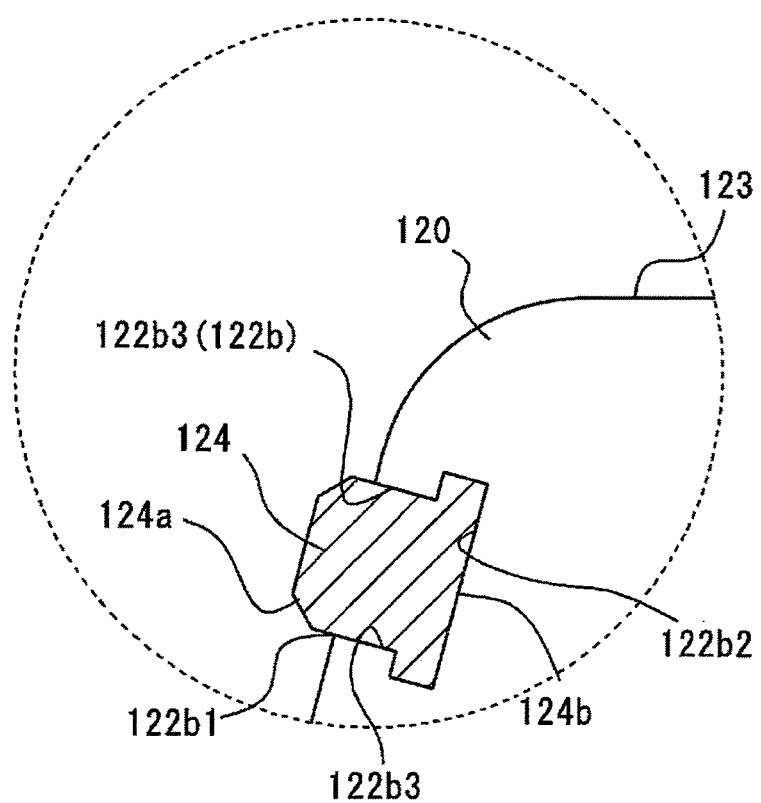
FIG. 14 is a cross-sectional view showing a seventh modification of FIG. 7.

FIG. 14 is a cross-sectional view showing a seventh modification of FIG. 7.

In the seventh modification, the holding groove 122b has a shape in which the bottom portion 122b2 is wider than the opening portion 122b1 as in FIG. 13, in the illustrated cross section. Specifically, the inner side surface 122b3 connecting the opening portion 122b1 and the bottom portion 122b2 is step-shaped so as to be narrowed from the bottom portion 122b2 toward the opening portion 122b1. In addition, the elastic member 124 has an end portion 124a having the same shape as that of the fifth modification and an end portion 124b having a shape complementary to the holding groove 122b.

According to the sixth and seventh modifications, since the elastic member 124 (particularly, the end portion 124b) is caught in the holding groove 122b, it is possible to prevent the elastic member 124 from coming off the holding groove 122b. In the present preferred embodiment, the end portion 124b of the elastic member 124 has a shape complementary to the holding groove 122b, but the present invention is not limited thereto. At the time of press molding, since the elastic member 124 receives pressure and deforms in accordance with the shape of the holding groove 122b, the effect of preventing the elastic member 124 from coming off can be exerted regardless of the shape of the elastic member 124.

Second Preferred Embodiment

Figure 15:
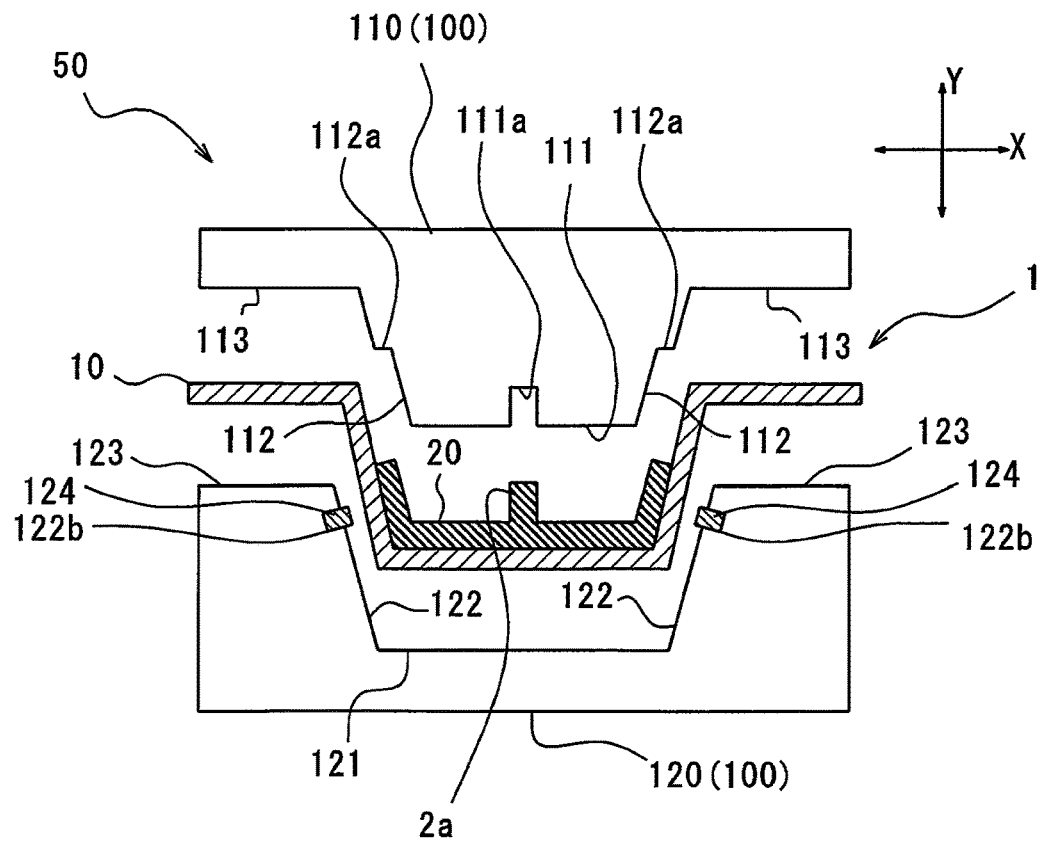
FIG. 15 is a cross-sectional view showing a fifth step of a method for manufacturing a metal-resin composite in a second preferred embodiment.

An apparatus 50 and a method for manufacturing a metal-resin composite 1 in the second preferred embodiment will be described with reference to FIG. 15. In the present preferred embodiment, the shape of the metal-resin composite 1 is different from that of the first preferred embodiment. Configurations other than the configuration related to this are the same as the configurations of the first preferred embodiment in FIGS. 1 to 6. Therefore, description of the portions shown in the first preferred embodiment may be omitted.

In the present preferred embodiment, the metal-resin composite 1 includes a protrusion 2a in the bottom wall portion 2. The protrusion 2a is made of a resin material 20 and extends vertically upward in an elongated manner. In addition, a recess 111a having a shape complementary to the protrusion 2a is formed on the first molding upper surface 111. The recess 111a opens downward on the first molding upper surface 111.

When the resin material 20 is molded to be elongated as with the protrusion 2a, a sufficient filling pressure is required, and here, since the filling pressure of the resin material 20 is increased by the elastic member 124, an elongated shape such as the protrusion 2a can also be stably molded.

As described above, although the specific preferred embodiments and their modifications of the present invention are described, the present invention is not limited to the above-described preferred embodiments, and can be implemented with various modifications within the scope of the present invention. For example, an appropriate combination of contents of the individual preferred embodiments and modifications may be one preferred embodiment of the present invention.

In addition, as the resin material 20, a thermoplastic resin impregnated with glass fibers or carbon fibers may be used. In this case, the resin material 20 is put into the mold 100 in a state of being heated and softened. Then, the metal-resin composite 1 is manufactured by cooling and curing the resin material 20 on the metal plate 10 in the mold 100.

In addition, in the metal-resin composite 1, an adhesive layer may be provided between the metal plate 10 and the resin material 20. In this case, by providing the adhesive layer, the metal member 10 and the resin material 20 can be firmly integrally molded.

Figure 16:
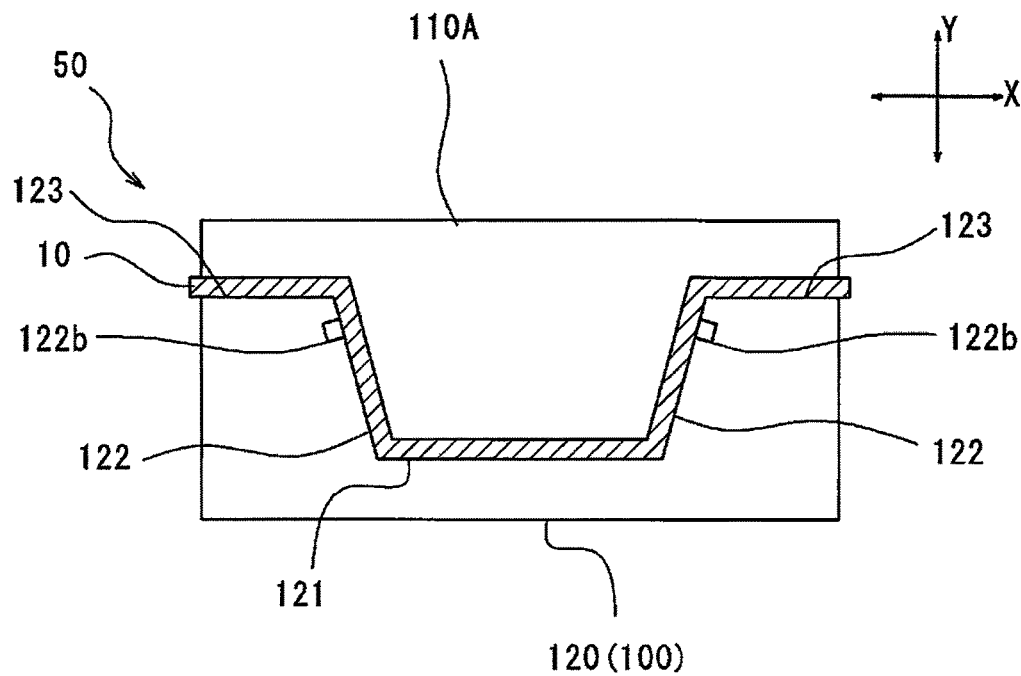
FIG. 16 is a cross-sectional view showing a second step of a method for manufacturing a metal-resin composite in another modification.

In addition, referring to FIG. 16, the metal plate 10 may be press-molded into a complete hat shape in the second step (the first round of pressing). In this case, an upper mold 110A having a complete hat-shaped molding surface is used so as to press-mold the metal plate 10 into a complete hat shape. Alternatively, the same upper mold may be used in the first round of pressing and the second round of pressing. In addition, in the example in FIG. 16, the elastic member 124 is not attached to the holding groove 122b. This is because, since the resin material 20 is not disposed in the first round of pressing, it is not necessary to attach the elastic member 124 that suppresses the leakage of the resin material 20. It should be noted that different lower mold may be used in the first round of pressing and the second round of pressing, and the lower mold used in the first round of pressing does not need to include the holding groove 122b.

What is claimed is:

1. A method for manufacturing a metal-resin composite by press-molding a metal member and a resin material, the method comprising:
arranging a lower mold, the metal member, the resin material, and an upper mold in this order,
sandwiching the metal member and the resin material with the upper mold and the lower mold;
pressing the metal member against the upper mold through an elastic member attached only to a molding surface of the lower mold by the sandwiching to seal a cavity formed by the upper mold and the lower mold; and
integrating the metal member and the resin material by the press molding while sealing the resin material into the cavity.

2. The method according to claim 1,
wherein the metal-resin composite has, in a cross section perpendicular to a longitudinal direction, a bottom wall portion extending in a horizontal direction, a side wall portion rising from each of both ends of the bottom wall portion, and a flange portion extending outward in a horizontal direction from the side wall portion,
wherein the upper mold has, in the cross section, a first molding upper surface for molding the bottom wall portion, a second molding upper surface for molding the side wall portion, and a third molding upper surface for molding the flange portion, and
wherein the lower mold has, in the cross section, a first molding lower surface for molding the bottom wall portion, a second molding lower surface for molding the side wall portion, and a third molding lower surface for molding the flange portion.

3. The method according to claim 2, wherein the second molding upper surface is provided with a step.

4. The method according to claim 3,
wherein the second molding lower surface is provided with a holding groove for holding the elastic member, and
wherein a thickness of the elastic member is greater than a depth of the holding groove.

5. The method according to claim 4, wherein the holding groove has a shape in which a bottom portion is wider than an opening portion in the cross section.

6. The method according to claim 4, wherein the holding groove is, in the cross section, disposed at a same height position as the step or at a position higher than the step in a state where the upper mold and the lower mold are closed.

7. The method according to claim 4, wherein the elastic member has, in the cross section, a shape in which an end portion protruding from the holding groove is chamfered or rounded.

8. The method according to claim 4, wherein the elastic member has, in the cross section, a shape in which an end portion to be inserted into the holding groove is chamfered or rounded.

9. The method according to claim 1, further comprising press-molding only the metal member into a hat shape before integrating the metal member and the resin material by the press molding.

10. The method according to claim 5, wherein the holding groove is, in the cross section, disposed at a same height position as the step or at a position higher than the step in a state where the upper mold and the lower mold are closed.

11. The method according to claim 5, wherein the elastic member has, in the cross section, a shape in which an end portion protruding from the holding groove is chamfered or rounded.

12. The method according to claim 6, wherein the elastic member has, in the cross section, a shape in which an end portion protruding from the holding groove is chamfered or rounded.

13. The method according to claim 11, wherein the elastic member has, in the cross section, a shape in which an end portion protruding from the holding groove is chamfered or rounded.

14. The method according to claim 5, wherein the elastic member has, in the cross section, a shape in which an end portion to be inserted into the holding groove is chamfered or rounded.

15. The method according to claim 6, wherein the elastic member has, in the cross section, a shape in which an end portion to be inserted into the holding groove is chamfered or rounded.

16. The method according to claim 7, wherein the elastic member has, in the cross section, a shape in which an end portion to be inserted into the holding groove is chamfered or rounded.

17. The method according to claim 10, wherein the elastic member has, in the cross section, a shape in which an end portion to be inserted into the holding groove is chamfered or rounded.

18. The method according to claim 11, wherein the elastic member has, in the cross section, a shape in which an end portion to be inserted into the holding groove is chamfered or rounded.

19. The method according to claim 12, wherein the elastic member has, in the cross section, a shape in which an end portion to be inserted into the holding groove is chamfered or rounded.

* * * * *